United States Patent [19]

Sakata et al.

[11] 4,438,566

[45] Mar. 27, 1984

[54] INNER DIAMETER MEASURING INSTRUMENT

[75] Inventors: Hideo Sakata; Ichiro Mizuno; Masao Nakahara, all of Kawasaki, Japan

[73] Assignee: Mitutoyo Mfg. Co., Ltd., Tokyo, Japan

[21] Appl. No.: 369,777

[22] Filed: Apr. 19, 1982

[30] Foreign Application Priority Data

Apr. 30, 1981 [JP] Japan .............................. 56-62770[U]
Apr. 30, 1981 [JP] Japan .................................. 56-65705

[51] Int. Cl.$^3$ .............................................. G01B 5/12
[52] U.S. Cl. .................................. 33/178 R; 33/147 F; 33/147 K
[58] Field of Search .............. 33/147 F, 147 K, 178 R

[56] References Cited

U.S. PATENT DOCUMENTS

| 2,312,222 | 2/1943 | Tanner | 33/178 R |
| 2,369,319 | 2/1945 | Smith | 33/178 R |
| 2,566,970 | 9/1951 | Swensson | 33/178 R |
| 3,995,374 | 12/1976 | Fisk | 33/178 R |
| 4,045,877 | 9/1977 | Rutter | 33/178 R |
| 4,288,924 | 9/1981 | Mizuno et al. | 33/147 F |

FOREIGN PATENT DOCUMENTS 546554 11/1922 France ............................. 33/178 R Primary Examiner—Richard R. Stearns
Attorney, Agent, or Firm—Flynn, Thiel, Boutell & Tanis

[57] ABSTRACT

An inner diameter measuring instrument wherein the measuring pressure of measuring elements is adjustable from outside and the measuring elements can be retracted by a pair of levers. A spring is confined between a movable member secured to a spindle and an abutting member formed on the outer surface thereof with a tapered surface, and a biasing force of this spring is adjustable by the movement of the movable member due to rotation of a control member mounted to the main body of the measuring instrument. The abutting member is upwardly moved by a pair of levers each provided thereon with a pusher member penetrating through the main body for pushing the abutting member, so that the measuring elements biased in the radial directions of the spindle can be retracted.

11 Claims, 4 Drawing Figures

INNER DIAMETER MEASURING INSTRUMENT

BACKGROUND OF THE INVENTION

1. Field of the Invention

This invention relates to an inner diameter measuring instrument for measuring a hole diameter and the like of an article to be measured by measuring elements linearly movable in the radial direction of a spindle, following the movement of the spindle.

2. Description of the Prior Art

As the conventional inner diameter measuring instrument, there has been known one having a construction that a dial gauge is secured to one end of a cylindrical main body, a spindle for pushing and moving a measuring rod of the dial gauge is slidably incorporated in the main body, and measuring elements are provided at the other end of the main body, which are linearly movable in directions perpendicular to the spindle, following the movement of the spindle.

With the conventional inner diameter measuring instrument of the type described, a spring for constantly biasing the measuring elements in the projecting directions is confined between the main body and the spindle, however, in the conventional construction, it has been impossible to adjust the biasing force of this spring from outside. Because of this, when it is desired to change a measuring pressure due to the quality of the material and the like of the article to be measured, the measuring instrument has had to be disassembled to replace the spring with a new one, thus requiring great care, and hence, the need has been voiced for an inner diameter measuring instrument wherein the measuring pressure of the measuring elements is readily adjustable from outside.

Further, in order to retract the measuring elements in measuring the inner diameter of a hole formed in the article to be measured, it has been necessary to cause the spindle to be replaced against the resiliency of the spring, thus requiring the provision of a lever for controlling the spindle from outside.

The conventional inner diameter measuring instrument has been of such an arrangement that the lever comprises a single lever rotatably supported at one end thereof by the main body, a slot is formed at a working end thereof, a pin of the spindle is coupled into the aforesaid slot, and the lever is rotated to directly displace the spindle.

However, since the conventional inner diameter measuring instrument has such a construction that the spindle is displaced against the cylindrical main body by rotation of the single lever, such disadvantages have been presented that, in operating the lever, the posture of the main body becomes unstable, so that the measuring elements abutting against the article to be measured can not be set at positions intended, the lever which is elongated for the purpose of increasing the movement of the spindle causes low controllability, and further, increased frictional resistance between the lever and the pin brings about low controllability in this respect also.

To obviate the above-described disadvantages, there has been proposed such a construction that two levers are provided and these two levers are connected to the spindle by means of a link extending through a slot formed in the cylindrical main body (U.S. Pat. No. 4,288,024 and DE-OS No. 3,001,634).

However, this construcion of connecting by means of the link presents the disadvantages that operation of connecting the link to the spindle is necessitated to be done in a very narrow cylindrical main body, whereby assembling efficiency becomes very low, large-sized components thereof require a large number of man hours for working, and the indispensable provision of the slots in the main body, through which the links are extended, results in low dust exclusion in the main body.

SUMMARY OF THE INVENTION

The present invention has as its object the provision of an inner diameter measuring instrument wherein the measuring pressure can be readily adjusted from outside and assembly can be readily made.

To achieve the above-described object, the present invention contemplates that a freely movable member is provided on the spindle, a spring is confined between this movable member and the spindle for biasing the measuring elements to project in the radial directions of the spindle, a control member is rotably mounted on the main body, a rotation of this control member is transmitted to the aforesaid movable member through an interlocking mechanism as an axial movement of the spindle, and the movable member is moved by rotatable control of the control member, so that the biasing force of the spring can be adjusted.

Additionally, to achieve the above-described object better, the present invention contemplates that an abutting member formed on the outer surface thereof with a tapered surface is provided on the spindle, a pusher member capable of abutting the tapered surface of the abutting member is secured to control means such as a lever, penetrating through the main body, and the spindle is controlled by this pusher member through the abutting member.

DETAILED DESCRIPTION OF THE PREFERRED EMBODIMENT

Description will hereunder be given of one embodiment of the present invention with reference to the drawings.

Figure 1:
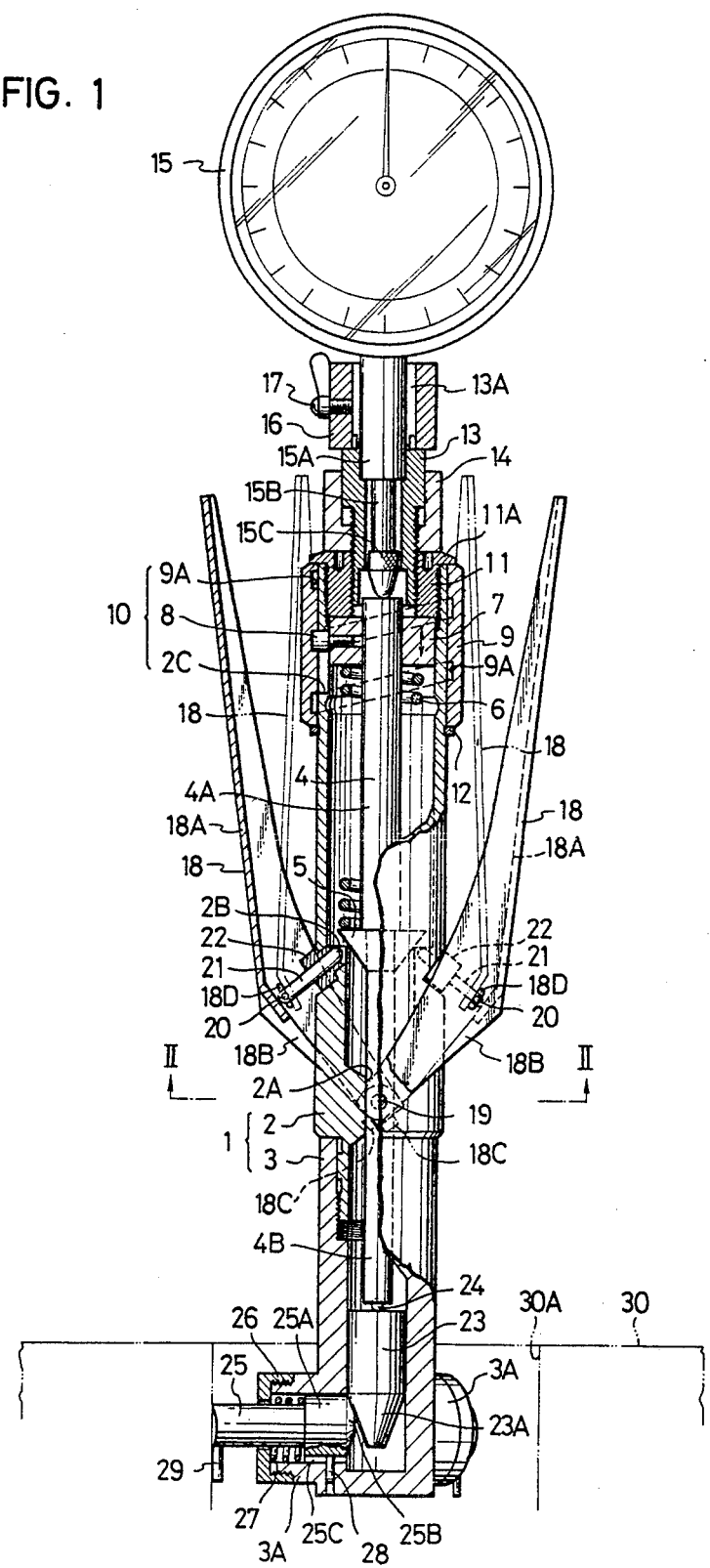
FIG. 1 is a sectional view showing one embodiment of the inner diameter measuring instrument according to the present invention.

In FIG. 1 showing the general arrangement, a cylindrical main body or housing 1 comprises a first cylindrical member 2 and a second cylindrical member 3 threadably coupled and affixed to one end of this first cylindrical member 2. A spindle 4 is axially movably incorporated in a central chamber of this main body 1. This spindle 4 is integrally constituted by a large diameter portion 4A and a small diameter portion 4B, and this small diameter portion 4B is slidably inserted into a small inner diameter portion 2A formed at one end of the first cylindrical member 2.

A frusto-conical abutting member 5 provided at the center thereof with a cylindrical hole is affixed to a stepped portion between the large diameter portion 4A and the small diameter portion 4B of the aforesaid spindle 4 through suitable means such as pressure fitting, bonding or the like. A compression coil spring 6 is abutted at one end thereof against the upper surface of this abutting member 5 and at the other end thereof against the under surface of a movable member 7. This movable member 7 is coupled onto the large diameter portion 4A of the spindle 4 in a manner to be movable in the axial direction of the spindle 4. Additionally, a tapered surface formed on the outer surface of the abutting member 5 is engaged with a stepped portion 2B formed on the inner surface of the first cylindrical member 2 by a biasing force of the spring 6.

The outer periphery of the aforesaid movable member 7 is in slidable contact with the inner surface of the first cylindrical member 2, and an engageable member 8 formed of a small screw is planted on the peripheral surface of this movable member 7. The outer end portion of this engageable member 8 extends through a slot-like guide groove 2C penetratingly formed in the first cylindrical member 2 and projects to the outside, and this projecting portion is engaged with a spiral groove 9A formed on the inner surface of a control member 9 provided on the outer periphery of the first cylindrical member 2 in a manner to be rotatable but unmovable in the axial direction thereof. In this case, the guide groove 2C is formed in the axial direction of the spindle 4 and in a width slightly wider than the outer diameter of the engageable member 8, whereby the engageable member 8 is guided in a manner to be movable only in the axial direction of the spindle 4. Furthermore, the spiral groove 9A is formed at a comparatively large pitch and in a width slightly wider than the outer diameter of the engageable member 8, so that the engageable member 8 can move along the spiral groove 9A in accordance with the rotation of the control member 9. Here, the spiral groove 9A, the engageable member 8 and the guide groove 2C of the first cylindrical member 2 constitute an interlocking mechanism 10, through which the rotational movement of the control member 9 is transmitted to the movable member 7 as an axial movememt of the spindle 4. In this case, a knurling such as simple lines or twill lines is suitably formed to facilitate rotational operation on the outer periphery of the control member 9.

Threadably coupled into the upper end of the first cylindrical member 2 as shown in the drawing is a nut 11 provided with a flange portion and formed on the inner and outer peripheries thereof with threads. A flange portion 11A of this nut 11 projects outwardly from the outer periphery of the first cylindrical member 2, and opposite end portions of the aforesaid control member 9 are clamped between this flange portion 11A and a C-ring 12 engaged with an intermediate portion of the outer periphery of the first cylindrical member 2, whereby the control member 9 is supported rotatably and axially unmovably on the outer periphery of the first cylindrical member 2.

Threadably coupled into the internally threaded portion of the aforesaid nut 11 is a threaded portion of a dial gauge holder 13, which is affixed in a position through a so-called double nut action of a lock nut 14 threadably coupled onto the externally threaded portion of the dial gauge holder 13 and the aforesaid nut 11. Inserted into the inner diametrical portion of this holder 13 is a stem 15A of a dial guage 15, and this stem 15A is solidly secured to the holder 13 through clamping action by a plurality of slot grooves 13A formed on the upper end side of the holder 13 in the drawing, a ring 16 coupled at the outer periphery of a portion formed with the aforesaid slot grooves 13A to the holder 13, and a fixing screw 17 threadably coupled to the ring 16 in a manner to be able to push the holder 13.

Additionally, a thread-in position of the holder 13 threaded into the nut 11 and a locking position of the lock nut 14 are adjustable to a suitable extent, and this adjustment is effected in accordance with the shape of the dial gauge 15, particularly to the length of a measuring rod (spindle) 15B, whereby the tip end of a tip 15C affixed to the forward end of the measuring rod 15B is abutted against an end face of a large diameter portion 4A of the spindle 4 under a predetermined measuring pressure.

Figure 2:
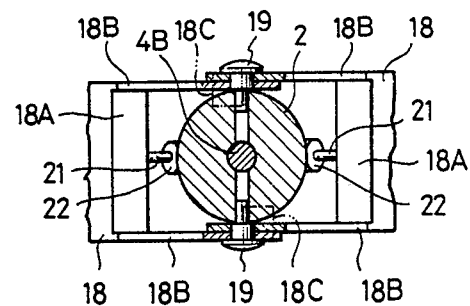
FIG. 2 is a sectional view in the direction indicated by the arrows from line II—II in FIG. 1.

Rotatably mounted through a shaft 19 to the outer periphery of the lower portion of the aforesaid first cylindrical member 2 as shown in the drawing are base ends of a pair of levers 18 as a control means. Each of these levers 18 is formed into a substantially U shape in cross section by thin plate working, and the base end portion of bottom plate 18A forming the lever 18 is cut away as shown in FIG. 2, so that a side plate 18B can be inserted through the outer surface of the first cylindrical member 2. As shown in FIG. 2, the base end portions of the both levers 18 are overlapped in such a manner that the side plates 18B at opposite sides are alternately overlapped with each other, engaging sides 18C inwardly bent are integrally formed on the side plates 18B disposed outwardly of the respective levers 18 at the aforesaid overlapped portions, and aforesaid engaging sides 18C are abutted against the outer surfaces of the levers 18 opposed thereto, whereby both levers 18 are engaged in a manner not to be able to open further than their states indicated by solid lines in Fig. 1.

Formed in the side plates 18B on the opposite sides thereof at portions further towards the free ends than the portions supported by the shaft 19, respectively, are slots 18D, across each of which is racked a pin 20. This pin 20 is made movable along the slot 18D, and the intermediate portion of the pin 20 is inserted through one end of a pusher member 21 of a short rod shape. The other end of this pusher member 21 is inserted into a hollow guide 22 threadably coupled into the first cylindrical member 2 at the stepped portion 2B of the first cylindrical member 2, penetrates the first cylindrical member 2 by way of this hollow guide 22 to be made to project into the first cylindrical member 2, and is made to abut against a tapered surface of the abutting member 5 engaged with the stepped portion 2B of this first cylindrical member 2. With the above-described arrangement, when the pusher member 21 is pushed into the first cylindrical member 2 and abutted against the abutting member 5 to be further pushed in, the pusher member 21 is adapted to push the abutting member 5 upward against the resiliency of the spring 6.

A working member 23 formed at the bottom end with a tapered surface 23A is inserted in a manner to be slidable in the axial direction of the spindle 4 into the inner diametrical portion of the second cylindrical member 3 threadably coupled and affixed to the bottom end of the aforesaid first cylindrical member 2, and a ball 24 having a small diameter is confined between the top end face of this working member 23 and the bottom end face of the small diameter portion 4B of the aforesaid spindle 4, whereby the spindle 4 and the working member 23 are interlocked with each other in point-to-point contact.

Figure 3:
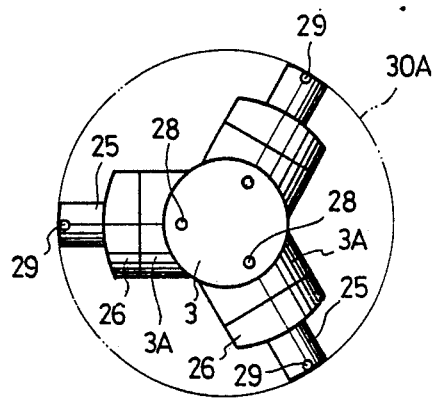
FIG. 3 is a bottom view of FIG. 1.
Figure 4:
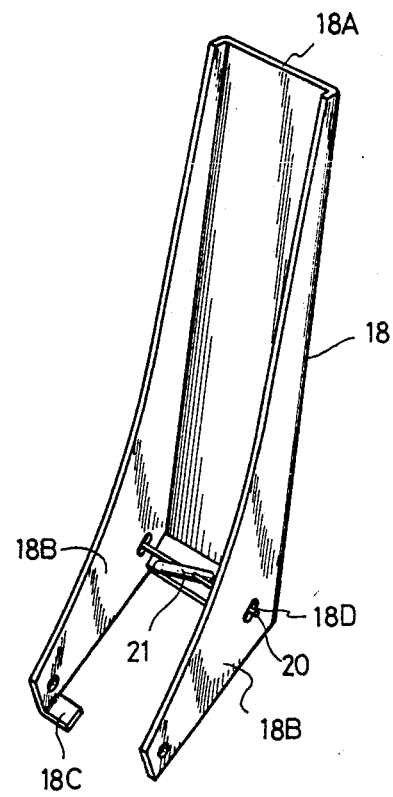
FIG. 4 is a perspective view showing the lever in FIG. 1.

Cylindrical guide members 3A are provided at the lower end portion of the aforesaid second cylindrical member 3 in a manner to project at regular angular intervals of 120° (Refer to FIG. 3), and a substantially mushroom-shaped measuring element 25 is inserted into each of the cylindrical guide members 3A in a manner to be linearly movable in a direction perpendicular to the aforesaid spindle 4, i.e., in the radial direction of the spindle 4. The inner end portion of this measuring element 25 is formed into a large diameter portion 25A, and the inner end of this large diameter portion 25A is formed into a tapered surface 25B being closely in contact with the tapered surface 23A of the aforesaid working member 23. Furthermore, a compression coil spring 27 is confined between this large diameter portion 25A and a box nut 26 threadably coupled to the end portion of the cylindrical guide member 3A, whereby the tapered surface 25B of the measuring element 25 is constantly biased to abut against the tapered surface 23A of the working member 23 through the resiliency of this spring 27.

A keyway or groove 25C is formed on the outer peripheral surface of the large diameter portion 25A of the aforesaid measuring element 25, and the tip end of a key or pin 28 inserted through the bottom surface of the second cylindrical member 3 is engaged with this keyway 25C, whereby the measuring element 25 slides without rotating, through the interaction between this key 28 and the keyway 25C. Further, an anvil 29 is projectingly provided at the outer end portion of the measuring element 25, and the anvils of all measuring elements 25 are adapted to accurately abut against the wall surface of the hole 30A of the article 30 to be measured.

Description will hereunder be given of the method of operation of this embodiment.

The two levers 18 are grasped together with the first cylindrical member 2 of the main body 1, and the levers 18 are turned about the shaft 19 to be drawn together toward the first cylindrical member 2 to the position indicated by chain lines in FIG. 1. By this, the pusher members 21 mounted to the levers 18 through the pins 20 are abutted against the abutting member 5 projectingly provided in the first cylindrical member 2, whereby the abutting member 5 is upwardly pushed against the resiliency of the spring 6. In this case, the pins 20 are movable along the slots 18D, so that the levers 18 can be smoothly turned. Elevation of the aforesaid abutting member 5 causes the spindle 4 to be raised, whereby the force pushing the working member 23 downward is removed. By this, the respective measuring elements 25 retract into the second cylindrical member 3, while pushing the working member 23 upward by way of the tapered surfaces 25B and 23A, through the action of the compression coil springs 27.

Under this condition, if the measuring elements 25 are inserted into the hole 30A of the article 30 to be measured and then the force of grasping the levers 18 is gradually released, then the pusher members 21 are gradually retracted from the first cylindrical member 2, and the spindle 4 is downwardly displaced through the resilient force of the spring 6 to urge the measuring elements 25 in the projecting directions through the working member 23. In this case, since the resilient forces of the springs 27 inwardly biasing the measuring elements 25 are set at comparatively low value, the springs 27 cannot resist the resilient force of the spring 6, the respective measuring elements 25 are pushed out against the resilient forces of the springs 27, and finally, the outer ends of the respective measuring elements 25 abut the inner wall of the hole 30A of the article 30 to be measured and stop thereat.

On the other hand, the measuring rod 15B of the dial gauge 15 vertically moves, following the vertical movement of the spindle 4, whereby, if a value indicated by the dial gauge 15 in the state where the aforesaid measuring element 25 is stopped is read as being a difference from the value indicated by the dial gauge 15 when the diameter of a hole of the reference dimension was previously measured, then this can be measured as the inner diameter of the hole 30A.

Now, when the material quality of the article 30 to be measured is varied and the like, it is necessary to change the measuring pressure by the spring 6. In this case, such an adjustment can be effected through the operation of the control member 9. More specifically, if the control member 9 is rotated in the clockwise direction in looking from upward in FIG. 1, then the engageable member 8 is moved downward in FIG. 1 through the interaction between the spiral groove 9A and the guide groove 2C which are formed into left hand screws, whereby the movable member 7 is also moved downward, so that the resilient force of the spring 6 can be increased.

On the other hand, in order to decrease the resilient force of the spring 6 from the state of the resilient force thereof thus increased, the control member 9 should be rotated in the reverse direction.

This embodiment as described above can offer the following advantages.

The resiliency of the spring 6, i.e., the measuring pressure of the measuring elements 25 is readily adjustable through the interlocking mechanism 10 and the movable member 7 by mere rotation of the control member 9, and this mechanism for adjusting the resiliency is simplified in construction, thereby providing the mechanism at low cost.

Additionally, two levers 18 are provided and the levers 18 are inserted into the hole 30A of the article 30 to be measured in a state of being grasped together with the main body 1, whereby the inserted state keeps its shape, so that stable measurement can be conducted and one hand operation can be performed.

Further, the mechanism for elevating the spindle 4 against the resiliency of the spring 6 through the operation of the levers 18, in its assembling, requires no assembling operation in the first cylindrical member 2 at all, but only the insertion into the hollow guide 22 of the pusher members 21 of the lever 18, which have been assembled separately, whereby the number of man-hours for assembly can be reduced to a considerable extent as compared with the conventional construction using links and the like, and moreover, little adjustment is required. Additionally, the construction is simplified, so that the number of man-hours for working can be reduced and the general configuration can be rendered compact. Further, there are required no slots, which would be required for the movement of links in the conventional construction using the links, in the cylindrical member 2, and a substantially sealed construction is adoptable, so that dust exclusion effects can be enhanced. Furthermore, the dial gauge holder 13 is readily adjustable in its fixed position through the action of the nut 11 and the lock nut 14, so that the dial gauge holder 13 can be readily accommodated to assembling of a dial gauge 15 different in type and dimensions.

In the above-described embodiment, the interlocking mechanism for moving the movable member 7 is provided with one engageable member 8 and also one spiral groove 9A, however, such an arrangement may be adopted that a plurality of engageable members 8 are engaged with one or more spiral grooves 9A. Furthermore, the shape of the abutting member 5 should not necessarily be the frusto-conical shape, but may be of a square shape having an inclined surface for being abutted against by the pusher member 21, in short, it is satisfactory to form a tapered surface on the surface abutting against the pusher member 21. Further, this abutting member 5 may be engaged with the spindle 4 by any other means such as threadable coupling, or the abutting member 5 and the spindle 4 may be integrally formed by cutting. Furthermore, this abutting member 5 should not necessarily be of the arrangement of being engaged with the stepped portion 2B, but be of an arrangement that the pusher member 21 is extended to be engaged at the forward end thereof. In this case, however, it is necessary to make the stopper for limiting opening between the levers 18 have construction more rigid than the engaging sides 18C in the above-described embodiment. Additionally, the relief construction of the pusher member 21 at the fulcrum portion due to turnings of the levers 18 should not necessarily be limited to the construction having the slots 18D, and the hollow guide may be formed into an oscillating one to be accommodated to the relief.

With the above-described arrangement, the present invention can offer the advantage of providing an inner diameter measuring instrument wherein the measuring pressure can be readily adjusted from outside and assembling can be easily carried out.

What is claimed is:

1. An inner diameter measuring instrument wherein a spindle is axially movably incorporated in a cylindrical main body and measuring elements are made linearly movable in radial directions perpendicular to said spindle in response to the movement of said spindle, wherein the improvement comprises: a movable member movable in the axial direction of said spindle; a spring provided between said movable member and said spindle, said spring being biased in a direction for causing said measuring elements to project in radial directions with respect to said spindle; a control member rotatably mounted on said main body; an interlocking mechanism for transmitting the rotation of said control member to said movable member to cause axial movement of said movable member; and control means for moving said spindle in a predetermined direction against the action of said spring, said control means being rotatably secured to said main body.

2. An inner diameter measuring instrument as set forth in claim 1, wherein said interlocking mechanism comprises: at least one spiral groove formed on said control member; at least one engageable member engaged at one end with said spiral groove and affixed at the other end to said movable member; and an axially extending guide slot provided on said main body, having inserted thereinto said engageable member and guiding said engageable member in the axial direction of said spindle.

3. An inner diameter measuring instrument as set forth in claim 1, wherein: said control means comprises a pair of levers; the base end portions of said levers are rotatably mounted to said main body; an abutting member formed at the outer surface thereof with a tapered surface is provided on said spindle; and pusher members penetrating through said main body and made to be abutted against the tapered surface of said abutting member are secured to the free end portions of said levers.

4. An inner diameter measuring instrument as set forth in claim 3, wherein: each of said levers is formed with a pair of opposing side plates each having a slot therein; a pin is racked across said slots of each lever in a manner to be movable along said slots; and a forward end of a pusher member penetrated by said pin abuts against a tapered surface of said abutting member through a hollow guide secured to said main body and is capable of pushing said abutting member through rotation of said lever.

5. An inner diameter measuring instrument as set forth in claim 1, wherein: a nut is threadably coupled into the upper portion of said main body; a threaded portion of a dial gauge holder is threadably coupled into an internally threaded portion of said nut; and said holder is affixed through a double nut action of a lock nut threadably coupled onto the threaded portion of said holder and said nut.

6. An inner diameter measuring instrument comprising a main housing having an elongated central chamber, an elongated spindle disposed for lengthwise movement within said central chamber of said housing, a plurality of inner diameter measuring elements positioned near the forwardmost end of said instrument, each element being mounted for reversible radial movement relative to a common center and each being coupled to said spindle such that the radial positions assumed by said measuring elements are responsive to the position of said spindle in said central chamber, and an indicator adapted to indicate the position of said spindle and thereby indicate the inner diameter of a workpiece, wherein the improvement comprises:

a movable member disposed in said central chamber coaxial with said spindle and mounted thereon for sliding movement in the lengthwise direction of said spindle along the outer periphery thereof;

a spring provided in said central chamber so as to resiliently engage said movable member and said spindle to urge them in opposite directions;

abutment means defining a forwardmost position of said spindle, said spring being positioned to bias said spindle towards said forwardmost position, the position of said movable member determining the magnitude of the resilient force exerted by said spring against said spindle, and when said spindle is in its forward most position, said measuring elements are in respective radially outwardmost extended positions;

a control member rotatably mounted on the outer periphery of said main housing;

an interlocking mechanism which transmits rotation of said control member to said movable member and causes movement of said movable member within said central chamber in the lengthwise direction of said spindle, and said interlocking mechanism prevents movement of said movable member when said control member is stationary relative thereto; and means for reversibly moving said spindle rearwardly against the resilient force of said spring and reversibly moving said measuring elements radially inwardly in response to said rearward movement of said spindle, whereby said measuring elements can be inserted into a workpiece for measuring the inner diameter thereof, and then said measuring elements can be released so that said measuring elements move radially outwardly into engagement with said workpiece as said spindle moves concurrently forwardly, such that the extent of such forward movement of said spindle, as indicated by said indicator, corresponds to the inner diameter of said workpiece.

7. An inner diameter measuring instrument as claimed in claim 6, wherein said movable member is disposed near the rear end of said central chamber, said spindle has a frusto-conical abutting member thereon forwardly of said movable member, said spring is resiliently compressed between a front face of said movable member and a rear face of said frusto-conical abutting member, and said main housing includes a stepped portion on the inner periphery thereof, said stepped portion defining said abutment means such that a forwardly directed tapering face of said frusto-conical abutting member abuts against said stepped portion to define said forwardmost position of said spindle.

8. An inner diameter measuring instrument as claimed in claim 7, wherein said main housing and said control member are cylindrical, said control member has a spiral groove on the inner periphery thereof, and said housing has a guide slot therein which is elongated in the lengthwise direction of said spindle, and said interlocking mechanism comprises an engageable projection which is integral with and extends radially outwardly from said movable member, said engageable projection extending through said guide slot in said housing such that a radially outermost end portion thereof is slidably fitted into said spiral groove in said control member, said guide slot acting to prevent rotation of said engageable projection and said movable member relative to the axis of said spindle, whereby when said control member is rotated, said engageable projection slides within said spiral groove and slides along said guide slot, whereby the said movable member moves in the lengthwise direction of said spindle.

9. An inner diameter measuring instrument as claimed in claim 8, wherein said indicator comprises a dial guage, a stem connected to said dial guage which is secured to said housing, and a measuring rod which is in abutment with the upper face of said spindle, whereby lengthwise movement of said spindle causes corresponding lengthwise movement of said measuring rod and a corresponding value is indicated by said dial gauge.

10. An inner diameter measuring instrument as claimed in claim 7, wherein said means for reversibly moving said spindle and said measuring elements comprises a pair of levers rotatably mounted at respective forwardmost ends thereof on said housing, each of said levers being in direct engagement with an associated pusher member, which pusher member extends into said housing, such that when said levers are rotated so as to be drawn together, said pusher members are urged inwardly into abutment with the tapered surface of said frusto-conical abutment member, whereby said spindle is pushed rearwardly against the resilient force of said spring.

11. An inner diameter measuring instrument as claimed in claim 7, wherein said measuring elements move radially relative to the axis of said spindle.

* * * * *